J. H. MANSFIELD.
CARRIAGE FEED AND STOP MECHANISM.
APPLICATION FILED MAY 14, 1920.
1,376,714.
Patented May 3, 1921.
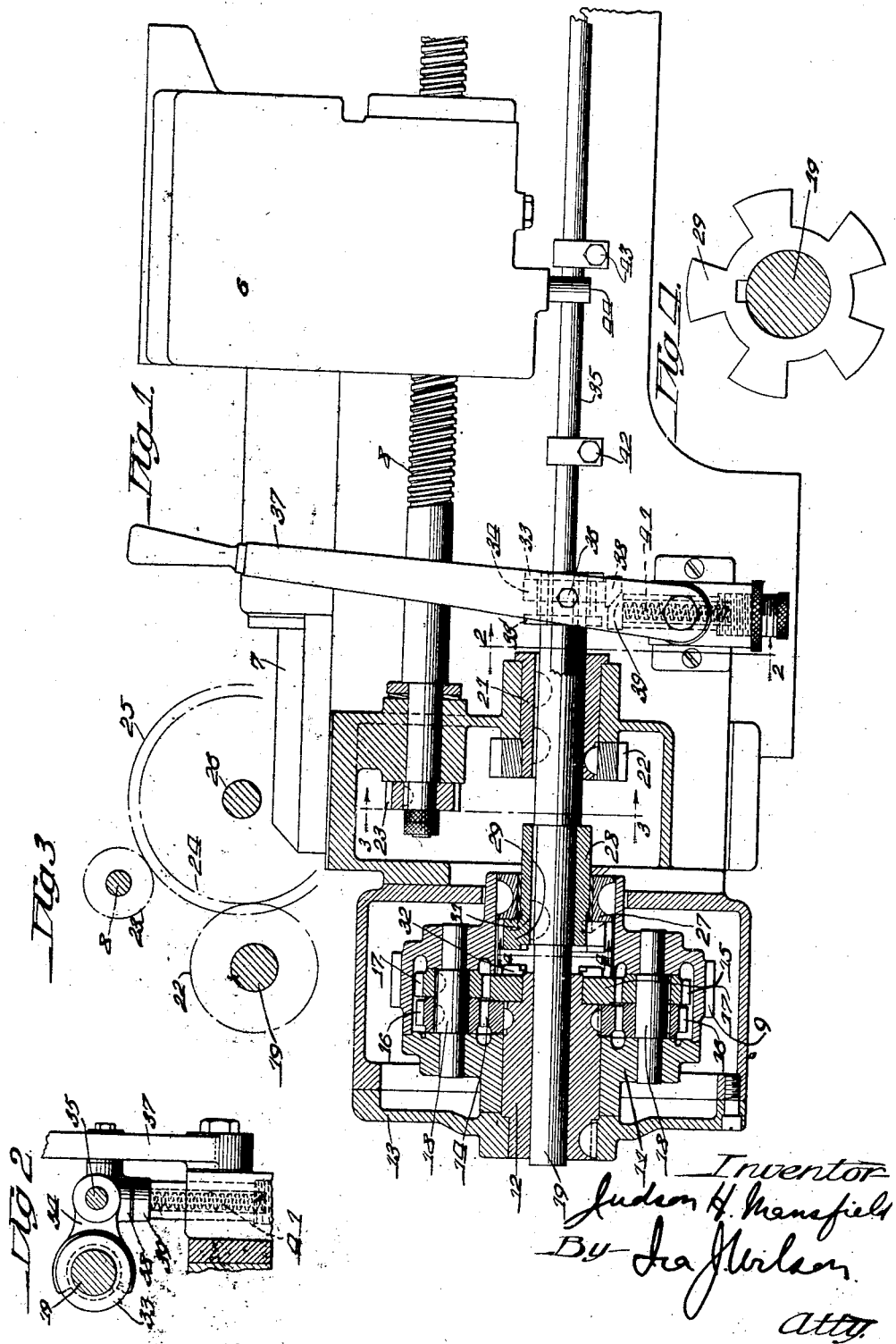

UNITED STATES PATENT OFFICE.

JUDSON H. MANSFIELD, OF ROCKFORD, ILLINOIS, ASSIGNOR TO GREENLEE BROS. & CO., OF ROCKFORD, ILLINOIS, A CORPORATION OF ILLINOIS.

CARRIAGE FEED AND STOP MECHANISM.

1,376,714.  Specification of Letters Patent.  Patented May 3, 1921.

Application filed May 14, 1920. Serial No. 381,430.

*To all whom it may concern:*

Be it known that I, JUDSON H. MANSFIELD, a citizen of the United States, residing at Rockford, in the county of Winnebago and State of Illinois, have invented certain new and useful Improvements in Carriage Feed and Stop Mechanism, of which the following is a specification.

This invention relates in general to metal-working machines, and has more particular reference to mechanism for feeding a tool carriage relatively to the work, or vice versa, and to the provision of means for automatically controlling the travel of the carriage with respect to its feed and reverse movements.

The primary object of the invention is to provide a simple and novel mechanism for imparting feed and reverse movements to a tool carriage, including means for automatically effecting the reverse feed. More particularly, I have aimed to provide a practical and efficient means for driving the feed screw of a tool carriage in a feed movement and for automatically reversing the drive at a predetermined point so as to control the action of the cutting tool or tools with accuracy and precision.

I have also aimed to provide a carriage feed mechanism of the character described, including a novel combination of gearing and clutches and control therefor, actuated by travel of the tool carriage at the end of its feed and reverse movements.

Other objects and attendant advantages will be appreciated as the invention becomes better understood by reference to the following description when considered in connection with the accompanying drawings, in which—

Figure 1 is a front view, partly in vertical section, showing a lathe equipped with a carriage feed and stop mechanism embodying my improvements;

Fig. 2, a detail sectional view taken on the line 2—2 of Fig. 1;

Fig. 3, a sectional view taken on the line 3—3 of Fig. 1, showing briefly the gearing between the clutch and feed shafts; and Fig. 4, an enlarged detail section taken on the line 4—4 of Fig. 1, showing one element of the feed clutch.

My invention contemplates the provision of a carriage feed and stop mechanism adapted for use in any of various metal-working machines in which it is desired to feed a tool carriage back and forth on supporting ways. In the drawing, I have shown simply in outline, a tool carriage 6 adapted to be moved back and forth on the ways 7 by rotation of the feed screw 8 in reverse directions. I employ a continuously revolving driving member, and interposed between this and the feed screw a system of gearing, including a clutch adapted to be actuated by travel of the tool carriage for reversing the drive of the feed screw.

The driving member consists of a gear 9 formed on the periphery of a planetary gear casing 11 revoluble upon and about a sleeve 12, in turn fixedly supported by a casing 13, fixed with respect to the main frame of the machine. The sleeve 12 carries a fixed spur gear 14 and a loose gear 15, these gears meshing respectively with intermediate gears 16 and 17 fixed to shafts 18 revolubly supported upon and between the sides of the gear casing 11. The foregoing provides an ordinary planetary gear arrangement by reason of which the gear 15 will be revolved in a reverse direction from that of the driving gear 9. While the machine is in operation the gear 9 is continuously revolved.

Coaxial of the planetary gearing, there is a clutch shaft designated generally by character 19, which has a bearing at one end in the sleeve 12 and at its opposite end is splined in a sleeve 21 supported by a suitable bearing on the frame of the machine. A gear 22 fixed to the sleeve 21 drives a gear 23 fixed to the feed shaft 8, through the intermediary of the gears 24 and 25 on a countershaft 26, as shown in Fig. 3. The driving connection between the shaft 19 and feed screw 8 may, however, be established in any suitable manner. By connecting the shaft 19 to either the driving gear 9 or the driven gear 15, the drive of the shaft may be reversed as will be obvious. To this end, I have provided a clutch for connecting to the shaft 19 either the gear 15, which I term a feed gear, or the sleeve clutch member 27 fixed to the casing 11, which sleeve member transmits the reverse feed movement. The shiftable clutch element comprises a sleeve 28 fixed to the shaft 19 and equipped with a toothed clutch head 29 adapted to engage either the clutch teeth 31 of the reverse feed member 27 or the teeth 32 of the feed gear 15. The clutch shaft 19 carries fixed collars 33 and 33' between which is disposed a yoke 34 carried by a shifting rod 35. This yoke is further connected by the bolt 36 to a hand lever 37. It will be observed, Fig. 1, that the width of the yoke is less than the dimension between the inner sides of the collar 33 and that the yoke carries on its under side a shoe 38 having an inclined surface coöperating with the inclined face of a plunger 39, constantly urged upwardly by a spring 41. The shifting rod 35 carries adjustable stops 42 and 43 adapted to be actuated by the tappet 44 carried by the tool carriage.

The operation of the foregoing mechanism is as follows: With the parts in the position shown in Fig. 1, and assuming that the gear 9 is continuously revolved in a clockwise direction viewing the left end thereof, the tool carriage 6 will be fed toward the left through the direct clutch connection between the driving gear casing and the clutch shaft 19, and the gearing 22 to 25 inclusive. When the tappet 44 engages the stop 42 it will shift the rod 35 to the left sufficiently to depress the plunger 39 and position the shoe 38 on top of said plunger and to shift the shaft 19 axially until the clutch head 29 is disengaged from the teeth 31 on the driving member. Thus the reverse feed movement of the tool carriage is automatically stopped. In order to establish the forward feed, the operator swings the upper end of the lever 37 to the left, thereby similarly shifting the clutch shaft 19 and engaging the clutch head 29 with the teeth 32 of the feed gear. The tool carriage will now be fed forwardly, that is, to the right, until the tappet 44 actuates the stop 43. During this feed movement, it will be observed that the shoe 38 is disposed on top of the compressed plunger 39 and that the fork 34 engages the collar 33'. The feed movement is terminated by the tappet 44 engaging the stop 43 and moving the fork 34 to the right until it strikes the collar 33 and by continued movement of the carriage 6, disengages the clutch member 29 from the feed clutch member 32. During this final movement the inclined surfaces of the shoe 38 and plunger 39 will be brought together, permitting the spring 41 to function and thrust the plunger upwardly, thereby rapidly moving the fork 34 to the right so as to instantly engage the reverse clutch. The tool carriage will thus be retracted to its starting position and there stopped in the manner above described. It will be noted that the tool carriage feed is stopped by the feed movement of the carriage and that instantly thereupon, the reverse clutch is engaged by influence of the spring 41. This action enables control of feed of the tools to a high degree of accuracy.

From the foregoing, it will be observed that the various coöperating parts are compactly arranged, and especially so in view of the co-axial relation of the shiftable clutch shaft 19 with respect to the planetary gearing; that this shiftable clutch shaft transmits the drive in reverse directions to the feed screw, and that the clutch shaft is shiftable in a practical and advantageous manner for controlling the feed and reverse movements of the tool carriage, and that the reverse movement is established in such manner as to stop the feed of the tools very accurately and in fact, to within but a very small percentage of variation between duplicate parts produced by the cutting tools. The parts in their coöperative relation are especially practical and serviceable for the purposes in mind.

It is believed that the foregoing conveys a clear understanding of the present invention, and while I have illustrated but a single working embodiment thereof, it should be understood that various changes might be made in the construction and arrangement without departing from the spirit and scope of the invention as expressed in the appended claims; in which—

I claim:

1. The combination with a tool carriage and a feed screw therefor, of a planetary gearing, a shaft co-axial with said gearing and carrying a fixed clutch element adapted by axial movement of the shaft to engage and disengage with either the driving or driven element of said gearing, a permanent driving connection between said clutch shaft and the feed screw, and means actuated by travel of the carriage for shifting said clutch shaft axially.

2. A carriage feed and stop mechanism comprising a tool carriage, a feed screw adapted to be driven in reverse directions for correspondingly feeding the carriage, a continuously revolving planetary gearing, including a driving and driven member, a clutch shaft co-axial with the planetary gearing and having a clutch element shiftable into and out of engagement with either said driving or driven member, and means actuated by the carriage in its travel for causing disengagement of said clutch element from either the driving or driven members.

3. The combination with a tool carriage and a feed screw therefor, of a planetary gearing, a clutch shaft co-axial with said gearing and shiftable axially to connect either the driving or driven element of said gearing to the clutch shaft, a driving connection between said shaft and the feed screw, means actuated by travel of the carriage for shifting the clutch shaft axially, and spring pressed means coöperating with the clutch shaft for imparting upon initial actuation by the carriage, a quick reverse movement to the clutch shaft.

4. The combination with a tool carriage and a feed screw therefor, of a planetary gearing, a clutch shaft co-axial therewith, a clutch element shiftable by axial movement of said shaft in opposite directions into and out of engagement with the driving and driven members of said gearing, a driving connection between the clutch shaft and feed screw, and means for shifting said clutch shaft axially to control the feed and reverse movements of the tool carriage.

5. In a carriage feed of the character described, the combination of a tool carriage and its feed screw, of mechanism for revolving said feed screw in reverse directions comprising a continuously revolved driving gear, a feed gear, planetary gearing between said driving and feed gears, whereby the latter will be revolved in the opposite direction to that of the driving gear, a shiftable clutch element adapted to be connected to either said driving or feed gear, a driving connection between said shiftable element and the feed screw, and control mechanism for shifting said clutch element to effect the feed and reverse movements of the tool carriage.

6. In a carriage feed of the character described, the combination of a tool carriage and its feed screw, of mechanism for revolving said feed screw in reverse directions comprising a continuously revolved driving gear, a feed gear, planetary gearing between said driving and feed gears, whereby the latter will be revolved in the opposite direction to that of the driving gear, a shiftable clutch element adapted to be connected to either said driving or feed gear, a driving connection between said shiftable element and the feed screw, a lever operable at will for shifting said clutch element to engage the feed gear and thereby establish feed movement, and means actuated by the tool carriage at a predetermined point in its feed movement for disengaging said clutch element to stop the carriage feed.

7. In a carriage feed of the character described, the combination of a tool carriage and its feed screw, of mechanism for revolving said feed screw in reverse directions comprising a continuously revolved driving gear, a feed gear, planetary gearing between said driving and feed gears, whereby the latter will be revolved in the opposite direction to that of the driving gear, a shiftable clutch element adapted to be connected to either said driving or feed gear, a driving connection between said shiftable element and the feed screw, and spring-actuated means for automatically imparting an additional shifting movement to said clutch element to connect with the driving gear to thereby establish the reverse feed.

8. In a carriage feed of the character described, the combination of a tool carriage and its feed screw, mechanism for revolving the feed screw in reverse directions including a feed clutch and a reverse clutch, means operated wholly by feed movement of the carriage to disengage the feed clutch, including a shoe moving with said means and a spring-pressed plunger having a cam engagement with said shoe whereby to actuate the same instantly after disengagement of the feed clutch and thereupon engage the reverse clutch.

JUDSON H. MANSFIELD.